United States Patent [19]
Wodeslavsky et al.

[11] Patent Number: 5,616,830
[45] Date of Patent: Apr. 1, 1997

[54] FLUID DRIP DETECTOR

[76] Inventors: Josef Wodeslavsky; Shirly Wodeslavsky, both of #5 Peter Lynas Ct., Tenafly, N.J. 07670

[21] Appl. No.: 488,569

[22] Filed: Jun. 8, 1995

[51] Int. Cl.⁶ .......................... G08B 21/00; G01N 27/00
[52] U.S. Cl. .................. 73/49.2; 73/40; 73/40.5 R; 340/605; 324/71.1; 137/312
[58] Field of Search .................... 73/49.2, 40.5, 73/40; 340/605, 606, 611, 612, 604; 324/71.1; 137/312, 313

[56] References Cited

U.S. PATENT DOCUMENTS

| | | | |
|---|---|---|---|
| 4,549,134 | 10/1985 | Weiss | 324/61 R |
| 4,724,479 | 2/1988 | Schmalfuss et al. | 358/100 |
| 4,796,658 | 1/1989 | Caple | 137/312 |
| 4,958,144 | 9/1990 | Griess | 340/606 |
| 4,994,749 | 2/1991 | Davies et al. | 324/637 |
| 5,040,409 | 8/1991 | Kiewit | 73/40.5 A |
| 5,091,715 | 2/1992 | Murphy | 340/604 |
| 5,214,387 | 5/1993 | Fenner | 324/557 |
| 5,246,067 | 9/1993 | Heinonen et al. | 166/81 |
| 5,381,097 | 1/1995 | Takatori et al. | 324/512 |
| 5,463,377 | 10/1995 | Kronberg | 340/605 |

*Primary Examiner*—Hezron E. Williams
*Assistant Examiner*—J. David Wiggins

[57] ABSTRACT

An electric resistance measuring device situated in fluids, comprising; a housing having a bore therethrough, the bore having a seat; a movable door means situated in the bore, engagable with the seat; whereby, fluid movement disengages the door from the seat, changing the electrical resistance between the seat and the door. Such a device can detect leaks which increase the electrical resistance between the seat and the door. A panel provides selector means which can be set at different modes, each mode providing a different period of time in which fluid can be used continuously without interruption. If fluid movement exists after such period, a cut off valve will shut off the fluid. Such a device can be installed in line with fire sprinklers, such that the device will detect a fire and will send a signal to a central station.

16 Claims, 7 Drawing Sheets

1

FLUID DRIP DETECTOR

BACKGROUND OF THE INVENTION

1. Field of the Invention

This invention relates generally to safety devices for turning off the fluid supply when there is merely a fluid drip, or to devices which inform a central station if the fire sprinklers are open. In the past, a problem existed when a drip would occur and would go undetected causing fluid waste and potentially leading to a more severe leak which would cause the house to flood very quickly.

2. Description of the Prior Art

Prior art offers devices which cut off the fluid supply when there is fluid flow or fluid leak. No prior art offers a solution to fluid drips. Examples of such fluid flow or leak detectors are U.S. Pat. Nos. 4,958,144, 4,791,414 and 4,252,088. The first two involve a system whereby when fluid flows it moves an arm significantly to block a light path. A mere drip would not be able to move the arm enough. U.S. Pat. No. 4,525,088 involves a leak detector whereby the fluid leak has to move a magnet away. Again, a mere drip would go undetected.

The prior art cannot be adapted to detect drips rather than leaks or flow because the prior art demands the fluid movement to cause an arm or an dement to move or shift relatively a significant distance in order for a detector to detect the movement or the shift. The deficiency of the prior art devices is that they detect movement of elements which have been moved by the fluid flow or leak.

Accordingly, a need remains for an improved device which can detect drips as well as leaks and flows where the detecting means does not necessitate that the fluid drip or flow will move any dement a significant distance.

SUMMARY OF THE INVENTION

It would be highly desirable to have a system which can readily be installed in fluid lines which would automatically turn off the fluid supply when a mere drip has developed. Accordingly, it is a principal object of the present invention to provide such a system.

It is another object of the invention to notify the user if there is a substantial leak or if there is just a drip.

It is another object of the present invention to provide a simple electronic circuit which will continuously monitor the status of the leak detector.

It is another object of the present invention to provide an electrical circuit which sends short, low current, pulsating signals into the fluid which will not harm the electric contacts which are in the fluid.

It is another object of the present invention to provide a drip detector which will detect increased electric resistance across the leak detector due to presence of a drip.

It is still another object of the invention to provide a selector which can be set to allow fluid usage for a pre set time when the system is armed, before the cut off valve will cut the fluid supply.

It is yet a further of the present invention to achieve the foregoing objects with a high degree of reliability and safety.

DESCRIPTION OF THE PREFERRED EMBODIMENT

Figure 1:
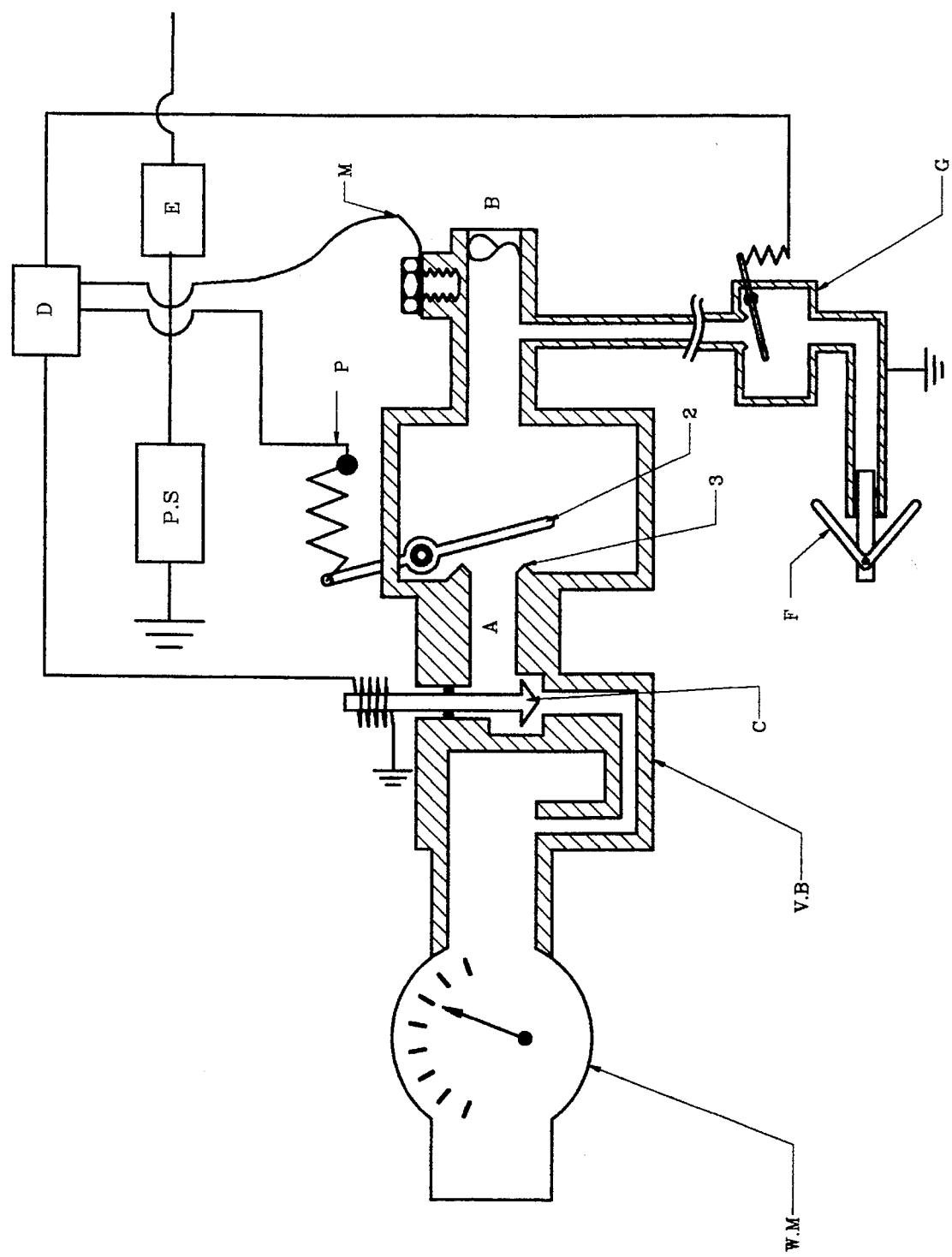
FIG. 1 illustrates the valve body WJ in a fluid line

FIG. 1 shows housing WJ which is attached to valve body VB which controls the flow of fluid from the fluid meter WM through electromagnetic valve C. Valve C is normally open, allowing fluid to pass through to the input flow inlet A when ever the valve C is not electrically activated. Housing WJ has a door 2 which is electrically connected to a lead P, which is electrically insulated from housing WJ. Housing WJ is grounded through lead M. An analyzer-detector circuit D is powered by power supply PS, the analyzer is electrically connected to lead P and M. When there is no drip, door 2 is seated against seat 3 in housing WJ to complete an electrical circuit between leads P and M. When there is a drip at outlet B, the hydraulic pressure at outlet B falls, causing fluid pressure on door 2 to push door 2 away from seat 3. The fluid between door 2 and seat 3 creates an increased resistance between leads P and M. Analyzer D detects this increased resistance across leads P and M. Analyzer D is electrically connected to an alarm panel E which is also powered by power supply PS. If the system is armed, when an increased resistance is detected by analyzer D, the alarm E is activated and valve C is activated to shut off the water.

An additional leak detector G can be installed near a fire sprinkler F, where this detector is also wired to analyzer D. When fire sprinkler F is open, detector D will activate the alarm panel E, sending a fire signal to the central station.

Figure 2:
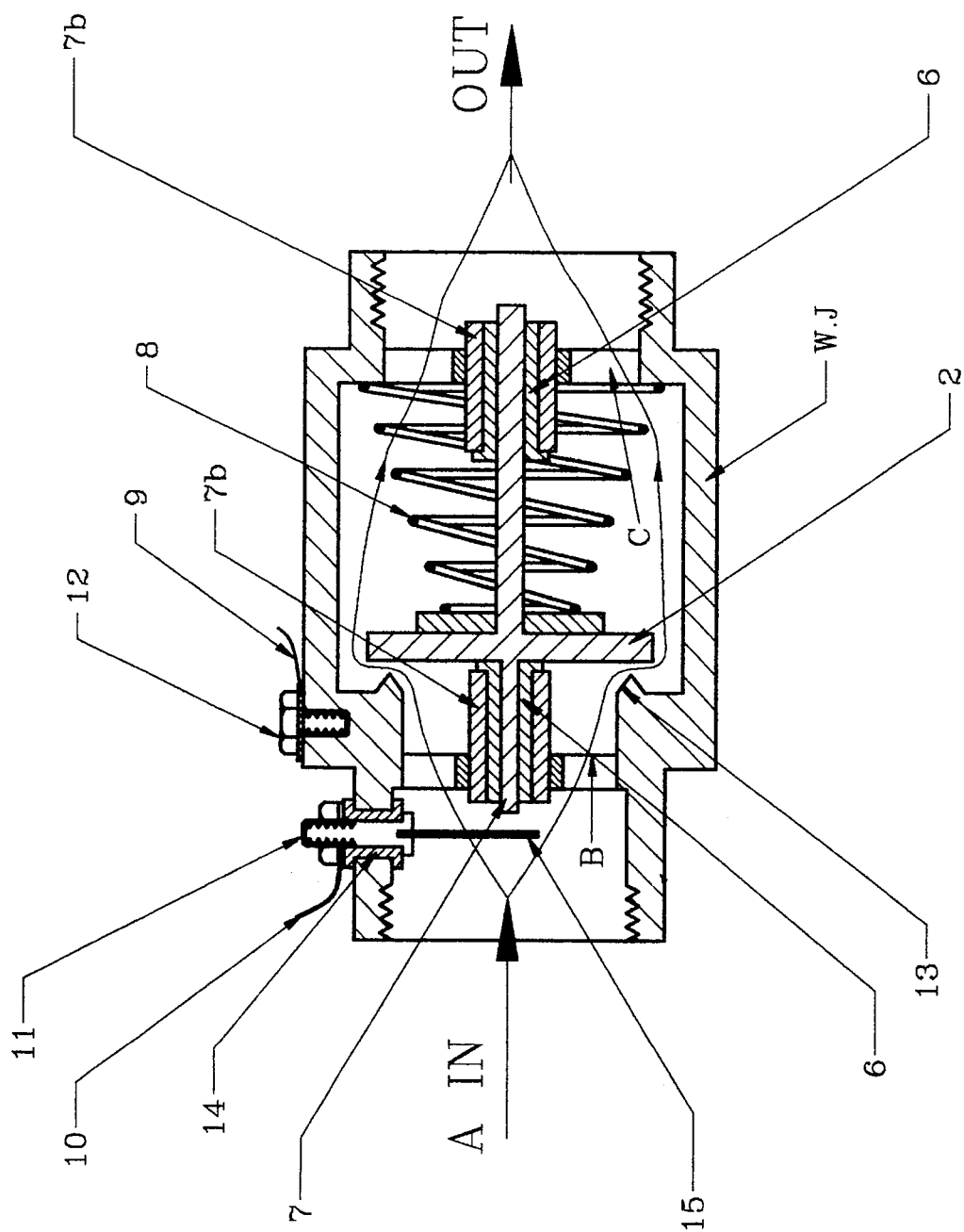
FIG. 2 is a cross section of valve body WJ having a sliding door.

FIG. 2 illustrates the valve housing WJ to be installed inside a fluid line. There is a screw 12 connected to the exterior of the housing, a lead is attached to the screw in order to ground the housing. A bolt 11 is mounted in the housing, being insulated from the housing via a bushing 14. The housing has a door seat 13 for a moveable door 2. A spring 8 urges the door against seat 13. Door 2 has a rod 7 connected to it. Rod 7 is electrically insulated from housing WJ by plastic bushing 6 and covered by a metal bushing 7b. Therefore, door 2 is electrically insulated from housing WJ when its not seated on seat 13. An elastic metal wire 15 is connected to bolt 11. Metal wire 15 is protruding into and out of housing WJ. When door 2 is seated on seat 13, it comes into communication with metal wire 15, completing a circuit between leads 9 and 10 such that there is no electrical resistance between leads 9 and 10. When a drip occurs in the region of the outlet B, hydraulic; pressure falls at the outlet. As a consequence, a film of water forms between door 2 and seat 13, pushing door 2 away from seat 13. Since metal contact between door 2 and seat 13 is lost, a greater spacing and electrical resistance is created between door 2 and seat 13. The increased resistance across leads 9 and 10 results in an output signal which activates the cut-off valve and the alarm. It is not the engagement and disengagement of rod 7 from metal wire 15 which activates the cut off valve during a drip. For that reason rod 7 can be permanently connected to metal wire 15 by flexible means such as a tension spring. [Not shown in the figure.]

It is important to note that its not the motion of the door that is detected, rather its the increased resistance between door 2 and seat 13 which is detected. This is a key difference between this invention and the prior art. Prior art is designed to detect mechanical motions caused by significant fluid movement. For those systems to operate, the mechanical motion must be large enough to be detected. Inherently, small drips do not result in any significant mechanical motion. Therefore, small drips, which cannot cause significant mechanical motions, cannot be detected by such prior art devices. On the other hand, this invention is designed to detect increase in electrical resistance. Since any drip will cause an increase in resistance, due to a formation of a water film between seat 13 and door 2, this invention can detect minute drips, which do not move the door any significant distance.

Figure 3:
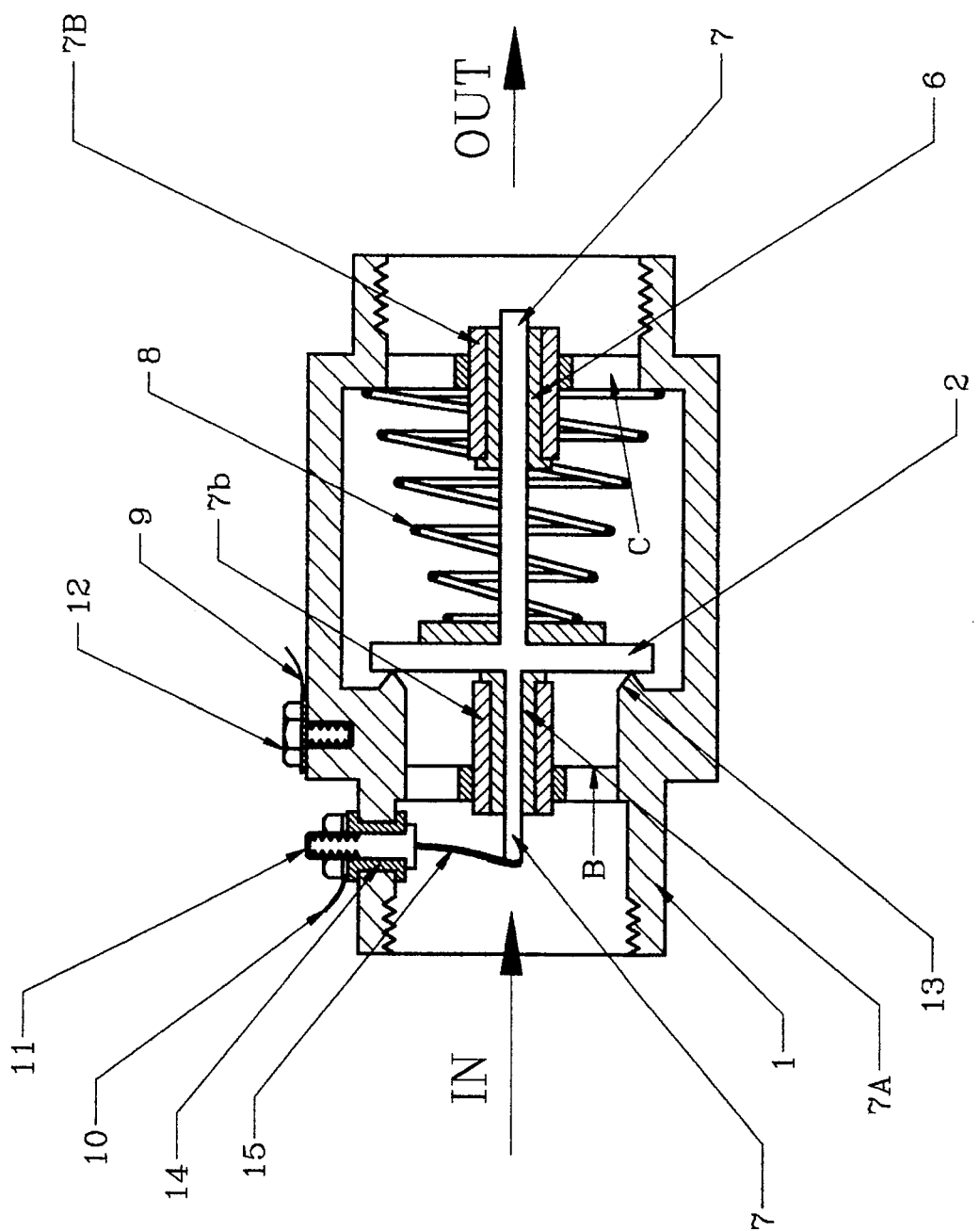
FIG. 3 is a cross section of the valve body WJ under a drip condition having double drip detection mechanisms

FIG. 3 illustrates the device where metal wire 15 is merely in contact with rod 7, but not connected to it when door 2 is seated against seat 13. By configuring the device this way there is a double detection mechanism. If the first mechanism does not detect a drip, the second mechanism will detect it. In operation, during a drip, while rod 7 is still in contact with metal wire 15, an increased resistance is detected between door 2 and seat 13, which will cause the detector circuit to shut off the water. If this drip detection does not occur for any reason, when rod 7 loses contact with metal wire 15, the detector circuit will shut off the water. Therefore, if the "door-seat" drip detection system fails, the "rod-metal wire" leak detection system will be present to cut off the water.

The moveable door in the above figures can have axial motion in the valve housing, sliding in the direction of the fluid.

Figure 4:
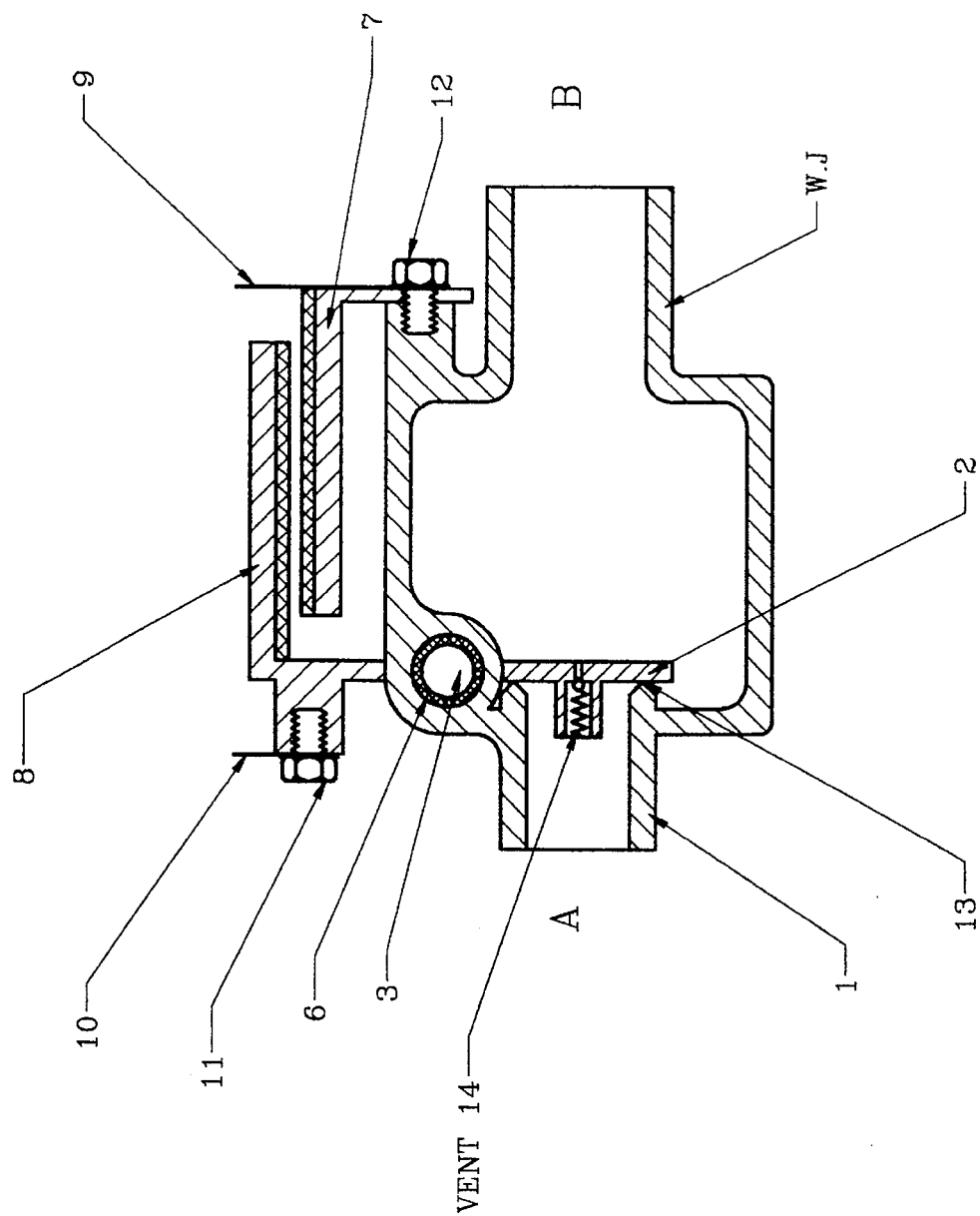
FIG. 4 is a cross section of the valve body having a pivoting door.

FIG. 4 illustrates the valve body WJ having a pivoting door 2 and seat 13. Sitting in bushing 6 is a hingepin 3 which is protruding from the housing. Bushing 6 is made of a highly electrically resistant material, thus hingepin 3 is insulated from housing WJ. A magnetic means is provided in order to urge the pivoting door 2 against seat 13. To the exterior of hingepin 3 a magnet 8 is connected. Bolt 11 connects an electric lead 10 to pin 3. Another magnet 7 is connected to the housing by means of bolt 12. The forces of attraction between the magnets 7 and 8 will cause hingepin 3 to turn, closing the pivoting door 2 on seat 13, closing an electric circuit between leads 9 and 10. When fluid flows across the housing, from input A to output B, the pivoting door will be unable to make contact with seat 13 and an increased resistance will be detected across leads 9 and 10. It is important to note that there is no detection of motion of the pivoting door, rather there is detection of change in electrical conductivity, ie when there is a drip, there is detection of increase in resistance due to formation of fluid insulation between door 2 and seat 13. A one way valve 14 is mounted in door 2 for releasing back pressure.

Figure 5:
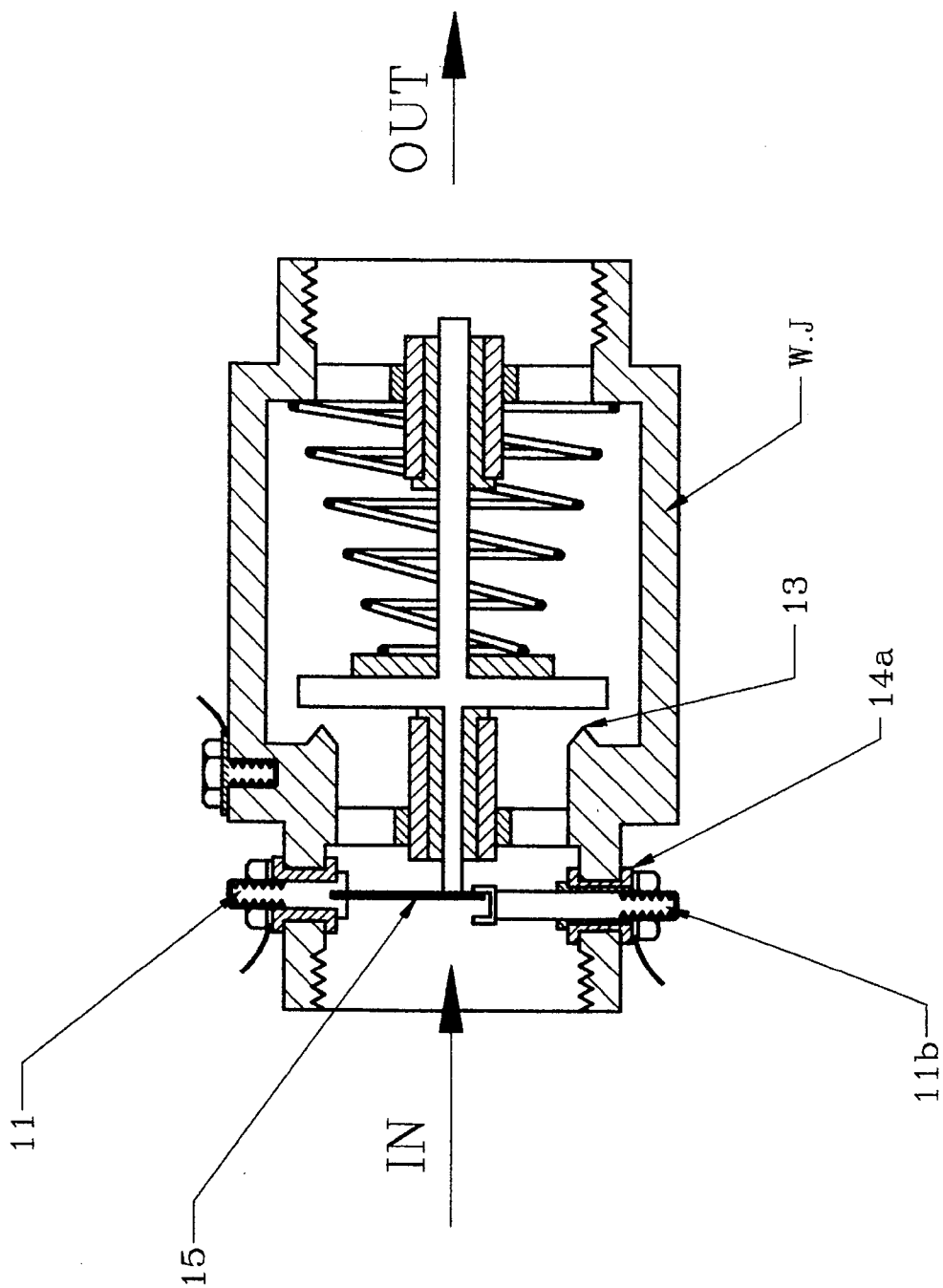
FIG. 5 is a cross section of the valve body being adapted to be connected to two detector circuits for distinguishing between a drip and a leak.

FIG. 5 is another double safety configuration assuring that if the first system does not detect a drip, the second system will detect a leak. The figure shows the valve body W.J. having an insulated bolt 11b protruding through the walls of the insulated bushing 14a that sits in body W.J. across from lead 15. A ring R is attached at the end of bolt 11b. Lead 15 is flexible and can move in ring R as door 2 moves towards seat 13. The other end of bolt 11b is protruding outside of the valve body, being connected to a second circuit panel of the analyzer circuit D. The electric contact between bolt 11b and bolt 11 will be detected by the second detector circuit of analyzer D. In operation, when only a drip occurs, and rod 7 is still urging/contacting lead 15, since a film of fluid will form an insulation layer between door 2 and seat 13, the first detector will detect the increase in resistance between door 2 and seat 13. When more than a drip occurs, such as when a leak or a flow occurs, the second detector will be activated. In such a case, door 2 will move significantly away from seat 13, and consequently, rod 7 will lose contact with lead 15. As rod 7 ceases urging lead 15, lead 15 will contact ring R, thereby creating an electrical contact between lead 15 and bolt 11B. If bolt 11 is grounded it will transmit ground signal to bolt 11b which will transmit the signal to the second detector circuit of analyzer D. The contact between lead 15 and bolt 11B will activate the second detector which will shut off the water. The user can therefore be notified if a drip or a leak has occurred.

It should be noted that housing WJ need not be conducting. If the housing is not conducting, seat 13 must be conducting, and a conducting lead must extend from the seat through the housing. Also, if the housing is not conducting, there is no need to insulate lead 15 or bolt 11 and 11B.

Figure 6:
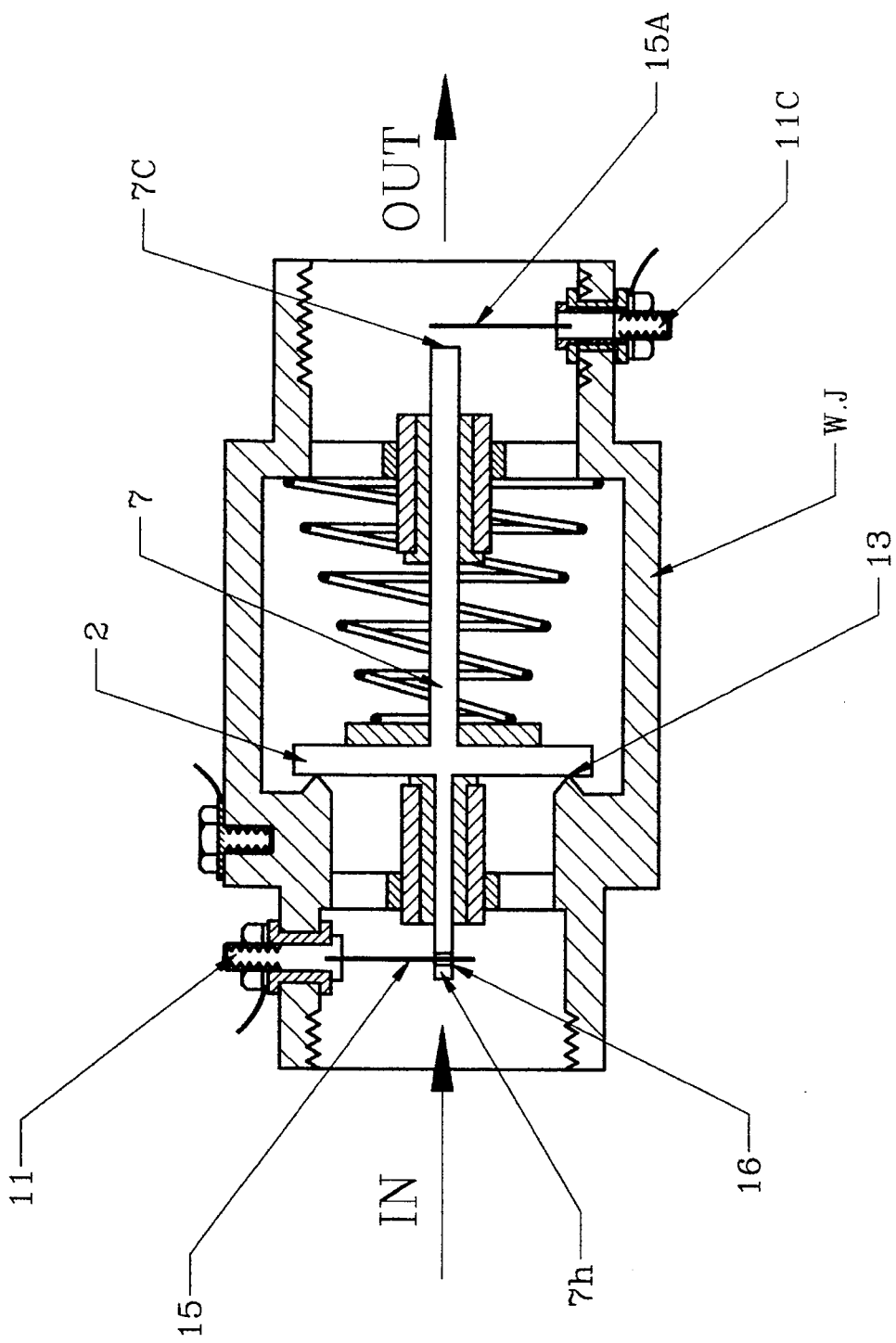
FIG. 6 is another configuration with two detector circuits for distinguishing between drips and leaks.

FIG. 6 shows another embodiment of a two detector circuit in which one circuit notifies the user if a drip occurs and the other circuit notifies the user if a leak occurs. Rod 7 has a first end 7c protruding in the direction of water outlet and a second end 7h protruding in the direction of the water inlet. Lead 15 is connected to the second end 7h of rod 7 through a flexible means, such that when door 2 moves away from seat 13, rod 7 pulls lead 15 in the direction of water flow. A second lead 15a is protruding from bushing 11c which is located in the wall of body WJ, adjacent the first end of rod 7. The first end of lead 15a protrudes out of housing WJ and a second end of lead 15a protrudes into the bore of housing WJ. A second detector circuit is connected to the first end of lead 15a. As explained above, the first detector circuit actuates the cut off valve if a drip occurs. When a leak occurs, and door 2 moves significantly away from seat 13, the first end of rod 7 contacts lead 15a. The second detector circuit detects the decrease in resistance between the first end 7c of rod 7 and the second end of lead 15a. Upon detection of this decreased resistance, the second detector circuit actuates cut off valve CV and shuts off the water. Notice that bushing 11c can be located in housing WJ in other locations. For example, bushing 11c could be placed to the right of door 2 such that during a leak, door 2 will contact lead 15a.

Figure 7:
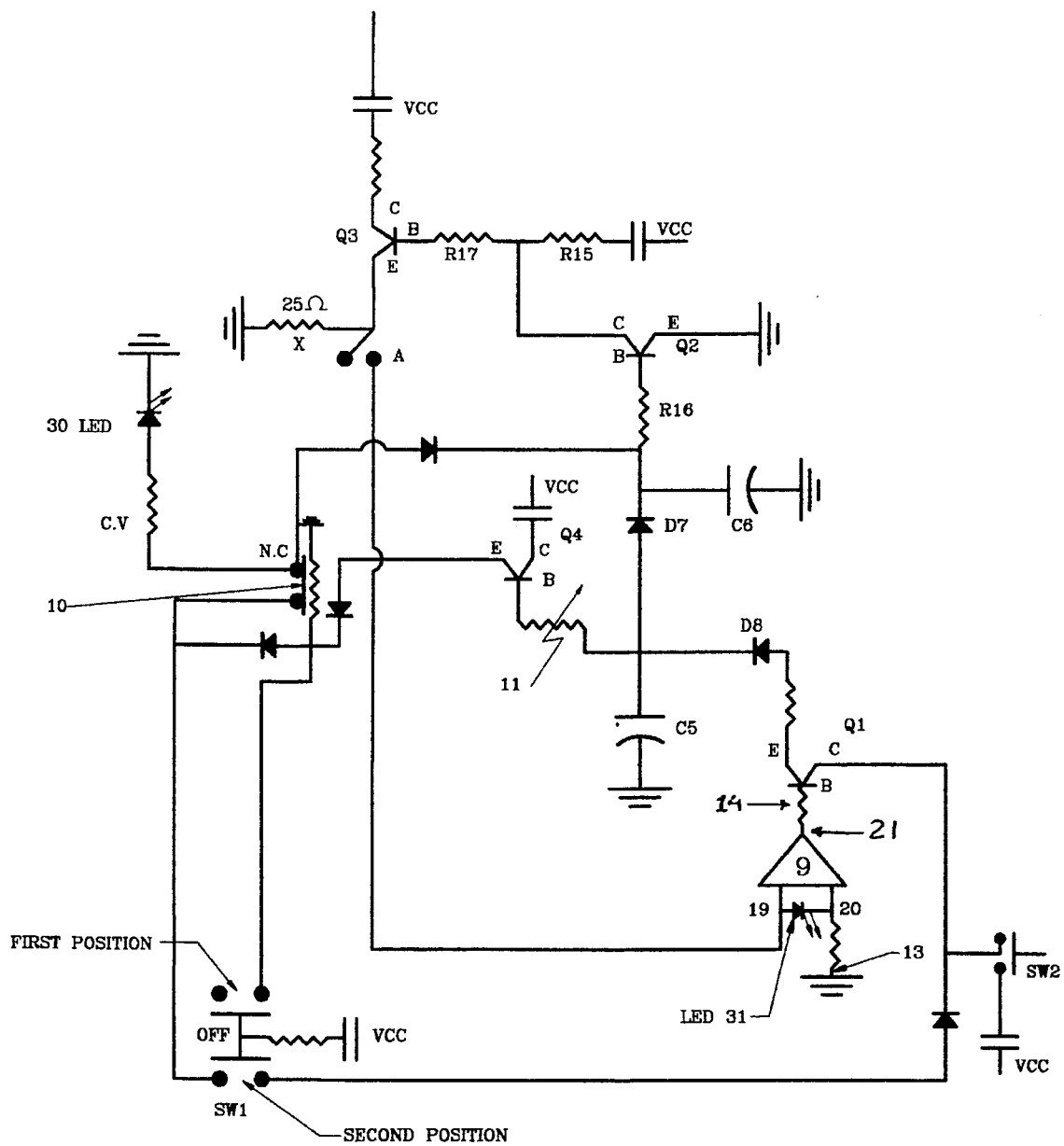
FIG. 7 is a detailed electrical circuit diagram of the electronic resistor detector assembly portion of the invention.

FIG. 7 shows the preferred electrical circuit according to the invention. This circuit will provide very low voltage short pulsating signals across the sensor A, while the sensor is in the fluid. The pulsating signals will continuously test the electrical resistance between door 2 and seat 13. The preferred embodiment uses short pulsating current signals rather than a continuous current signal in order to protect the conductors which are in the fluid. These pulsating signals will continue until a drip is detected.

When the system is armed, if it is still desirable to have certain fluid consuming appliances operate, the system can be pre set to allow fluid to run for a pre determined period without actuating the cut off valve. Therefore, if one activates the system and leaves the house he can select for example, a 5 minute period which will allow a wash machine to finish working. This is so because during each cycle, the wash machine takes approximately 3 minuets to fill up with water. Any fluid drips or flow occurring after the 5 minute interval have passed will be detected by the system, whereby the system will shut off the fluid supply and the alarm will be activated.

The electronic circuit comprises sensor A, transistors 1 through 4, capacitors 5 and 6, diodes 7 and 8, comparator 9, relay 10, LED 30 and 31, switches SW1 and SW2, resistors 13 through 18, potentiometer 11 and power supply Vcc.

The base of transistor 3 is connected to resistors 17 which is connected in series to resistor 15 which is connected to a 12 volt power supply Vcc. The emitter of transistor 3 is connected to sensor A. If no water is dripping, sensor A is connected to input 19 of comparator 9. The collector of transistor 3 is connected to the power supply Vcc. The reference voltage for comparator 9 is ground which is provided to input 20 of the comparator. When there is no drip, the input signal at input 19 is greater than the reference signal at input 20, and the output 21 of the comparator 9 will go to logic high. When there is a drip, there will be an increased resistance between door 2 and seat 13. This increased resistance will cause a greater voltage drop which will result in a lower input voltage at input 19 of comparator 9. A resistor 13 at reference input 20 is chosen such that in a drip situation the voltage at input 19 and reference 20 will be equal causing output 21 of comparator 9 will go to logic low. When output 21 is at logic high, a LED 31, which is connected between input 19 and 20 will be lit. A lit LED 31 will notify the user that no water is in use, and there is no drip or leak.

Output 21 of comparator 9 is connected to the base of transistor 1 through resistor 14. The collector of transistor 1 is connected to a 12 volt power supply via switch SW1. The emitter of transistor 1 is connected to the anode of diode 8. The cathode of diode 8 is connected to capacitor 5 and to the anode of a diode 7. Capacitor 5 is connected to a potentiometer 11 The potentiometer is connected to the base of transistor 4. The collector of transistor 4 is connected to a the power supply. The emitter of transistor 4 is connected to relay 10 which is normally closed. Relay 10 has one terminal connected to power supply PS via switch SW1, the other terminal is connected to a cut off valve CV. The cut off valve CV is actuated when the relay is off. A normally closed relay is chosen so that if the electronic circuit fails, automatically the relay coil will lose power and go to close position, activating the cut off valve which will then shut off the fluid supply.

The potentiometer 11 will be adjusted through external means whereby one can select a resistance which will prolong the period for which the base current flows to transistor 4. So long as base current flows to transistor 4, collector current flows to relay 10, keeping relay 10 ON and maintaining the cut off valve unactuated. This will permit the user to arm the system and yet .have water supplied to water consuming appliances such as garden sprinklers work. So long as the appliances do not consume water for durations longer than the pre set period, water will not be shut off by the cut off valve. For example, if the user has a garden sprinkler system which has 3 minute cycles every 20 minutes, the use can set the system on a 5 minute period. The garden will be watered so long as no drips occur after the 5 minutes are up.

The cathode of diode 7 is connected to a resistor 16 which is connected to the base of transistor 2, the diode is also connected to a capacitor 6. Resistor 16 is connected to the base of transistor 2. The emitter of transistor 2 is grounded and the collector of transistor 2 is connected between resistors 17 and 15. When output 21 of comparator 9 goes to logic high, transistor 1 is activated and its collector current will flow to capacitors 5 and through capacitor 6 current will also flow to the base of transistor 4. Also, base current flows to transistor 2 through resistor 16, activating transistor 2 and grounding its emitter. Resistor 17 is high enough to cause all of the collector current at transistor 2 to flow though resistor 15 to the ground. As a result, when the collector current of transistor 2 flows to the ground, transistor 3 is deprived of base current which will make it go low, and no collector current flows to input 19. Therefore, input 19 of comparator 9 goes low which causes output 21 to go low. While comparator 9 is low, capacitor 5 and 6 are still charged and therefore they alone will drive all the components of the circuit.

As long as the capacitors 5 and 6 are charged, transistors 2 and 4 remain activated. So long as transistor 4 is active, it keeps the coil of relay 10 active, which keeps relay 10 open. Resistance of resistor 16 is designed to let transistor 2 go low before transistor 4 is low. Each time transistor 2 goes low [ie, when its turned OFF], it allows base current to flow through resistor 15 and 17 to the base of transistor 3, allowing transistor 3 to go high. When transistor 3 is high input 19 to comparator 9 is high, which again charges the capacitors 5 and 6.

Thus, the first part of the cycle comprises a pulse to sensor A, resulting in a high input to comparator 9. This results in a logic high at the comparator output which charges capacitor 5 and 6, turning transistor 2 ON and depriving sensor A of current. As long as the capacitors are charged, no collector current flows at transistor 3, and the input 19 at comparator 9 is low. The second part of the cycle starts whereby the input to comparator 9 is at logic low and capacitor 5 discharges some of the charge such that it stops the flow of base current to transistor 2. This permits current from the power supply to flow to the base of transistor 3 for a millisecond, causing the output of the comparator 9 to go to logic high again, completing a full cycle. As capacitor 5 discharges, it maintains transistor 4 ON which provides current to coil of relay 10 assuring that the cut off valve CV will not be actuated during the part of the cycle where the output of comparator 9 goes to logic low. Thus, so long as there is no leak, transistor 4 is ON throughout the cycle keeping cutoff valve CV unactuated.

Capacitor 6 is provided to divert current away from the base of transistor 2. In so doing, capacitor 6 slows down the cycle so that capacitor 5 will have time to charge up. Notice, since capacitor 5 shares a node with resistor 16 which has a very high value, the current will flow to capacitor 6 rather than to the base of transistor 2. Since capacitors 5 and 6 are in parallel, [ignoring diode 7] the voltage of the capacitors is all most equal. As capacitor 6 charges, so does capacitor 5. When capacitor 6 is charged enough it will cause base current to flow through resistor 16 to the base of transistor 2. Only then will transistor 3 be OFF, and the input to comparator 9 will be low. Even when the output of comparator 9 is low, transistor 4 is maintained high by the discharging voltage from capacitor 5. Therefore, relay 10 is maintained normally open during both parts of the cycle, regardless of the statutes of the comparator.

Once the resistance between door 2 and seat 13 increases due to a drip, capacitor 5 will discharge into the potentiometer. If the potentiometer is set to a high resistance, capacitor's 5 discharge time will be longer, and thus transistor 4 will be maintained high longer, keeping the relay normally open for longer period and the cut off valve will remain unactuated. Once capacitor 5 has discharged enough such that it cannot provide the threshold base current to transistor 4, no DC current will be provided to coil of relay 10 and thus relay 10 will close, activating the cut off valve to shut off the fluid. Similarly, if the potentiometer is set to a low resistance, once sensor A senses a drip, capacitor 5 will discharge relatively quickly and turn relay 10 off. A LED 30 is connected to the cut off valve. When the cut off valve is activated, and fluid is shut off, LED 30 goes ON to notify the user. A resistor X can be placed in the circuit in order to divert the current of transistor 3 to the ground when sensor A is opened after detection of a fluid drop.

A diode 7A has its anode connected to the output of relay 10, and its cathode connected to the base of transistor 2. Once relay 10 is closed to shut off the fluid supply, transistor 2 will have permanent base current, which disables transistor 3, depriving sensor A's contacts of current. Therefore, so long as fluid is shut off by cut off valve CV, the electric contacts at sensor A will not receive pulsating signals.

To test the operability of the circuit, the cut off valve and sensor A, a switch SW1 is provided. In a first position, the switch is powering the cut off valve exclusively via relay 10. If the fluid is not turned off when the switch is in the first position, this means that something is wrong with the cut off valve. When the switch is in a second position, the system is armed. When switch SW1 is in a third position, the system is off. A switch button SW2 exists for testing the circuit and sensor A to the exclusion of the cut off valve. If following a push of test button SW2, LED 31 does not blink, either there is a drip, leak or fluid usage currently, or something is wrong with the circuit or with sensor A. An existing ordinary alarm panel can be adjusted to carry out the functions of switch SW1 and button SW2. Thus, an alarm can test, arm and disarm the system. By arming the alarm, simultaneously, the drip detector system will be armed as well.

The circuit can be built in a way that the cut off valve CV will be normally activated, and in case of a flood, power to the cut off valve CV will be cut off. Also, safety features can be added to the electronic circuit such as a monitor for monitoring the cut off valve in real time. Whenever the cut off valve fails, it can notify the user. Also a buzzer can be installed to notify the user of the status of the cut off valve. It should be noted that the above is only one possible design for the electronic circuit system. For example, a counter can be used to produce the pulsating signals.

We claim:

1. A fluid drip detector for detecting presence of drops and leaks of fluid via measured changes in electrical resistances, comprising: an electrically conducting housing having an electrical lead and first electrical contact protruding into the housing, the lead and contact being electrically insulated from the housing, the housing having a seat disposed therein;

an electrically conducting moving door means and second electrical contact situated in the housing, said moveable door means capable of mechanically engaging with and/or disengaging from the seat; the door means being responsive to a fluid drip via the hydraulic pressure drop caused by the presence of a drop in the housing thereby disengaging the door from the seat in a drip condition such that the electrical resistance between door and seat increases in a drip condition, but the door means is normally engaging the seat and the lead in a no drip condition characterized by a minimum resistance value between said door and seat; and an electric resistance detector means connected to the lead and said door means for producing an electrical output in the event of a drip condition.

2. A fluid drip detector as in claim 1 wherein the electrical output activates a cut off valve to shut off the fluid supply.

3. A fluid drip detector as in claim 2 wherein the electrical output activates an alarm.

4. A fluid drip detector as in claim 1 connected in fluid communication with a sprinkler-type fire suppressant system comprising a fluid pipe, alarm and sprinkler, wherein a second fluid drip detector is mounted in said fluid-pipe, such that an alarm is activated when the second fluid drop detector senses a drip at its location on said fluid-pipe.

5. A fluid drip detector as in claim 1 wherein the resistance detector comprises electrical pulse generating means for generating electrical pulsating signals for continuously checking the electrical resistance between the housing and the lead in order to protect the first and second electrical contacts of said electrical lead and said moving door means which are exposed to fluid.

6. A fluid drip detector as in claim 5, capable of detecting fluid movement, wherein the fluid drip detector additionally comprises an adjustable timer means connected to said resistance detector means for selecting a time period over which continuous fluid flow or movement is permitted thru said housing while ignoring the output signal of said resistance detector means for that said time period.

7. A fluid drip detector installed in a fluid feeding line for sensing presence of drops and leaks of fluid therefrom comprising, an electrically conducting hollow housing having a bore for fluid passage therethru;

a first electrical conductor, insulated from the housing, having a first end protruding into the bore and a second end protruding out of the housing, where said first end has a first electrical contact attached thereon;

a stationary seat and moveable door situated in the bore;

a conducting movable door means urged against the seat by urging means, the door being responsive to fluid drip via the hydraulic pressure drop caused by the presence of a drop in the housing, thereby disengaging the seat in a drip condition, and engaging the seat in a no drip condition, such that in a no drip condition the door communicates electrically with the first end of the first electrical conductor and engages the seat, creating a minimum electrical resistance between the door and the seat, and in a drip condition, the door being disengaged from the seat, thereby creating a change in resistance between the door and the seat, and first electric resistance detector means connected between the housing and the second end of the first electrical conductor for producing an output when detecting a change in electrical resistance.

8. A fluid drip detector as in claim 7 further having a second electrical conductor having a first end with a second electrical contact attached thereon protruding into the bore in the same radial plane as the first electrical conductor but disposed at a position diametrically opposed to the location of the first electrical conductor in said bore, the second electrical conductor having a second end protruding out of the housing, the second electrical conductor being electrically insulated from the housing, such that in a no drip condition the resistance between the first and second electrical conductors is at a relatively high level, and further, in a drip condition, the moveable door moves axially relative to the second electrical conductor whereby the resistance between the first and second electric contacts is decreased to a preset level, and further yet, in a leak or flow condition the first electric conductor contacts the second electrical conductor thereby decreasing the resistance between the first and second conductors to a minimum resistance value, and, second electric resistance detector circuit means connected between the second ends of the first and second electrical conductors for producing an output when there is minimum resistance between the first and second electric conductors.

9. A fluid drip detector as in claim 7 wherein the door has a first and a second contacts, the first electrical conductor is in continuous electrical communication with the first door contacts, the detector further having, a second electrical conductor, located adjacent to the second contacts of the door, has a first end protruding into the bore and a second end protruding out of the housing, the second electrical conductor being insulated from the housing, such that in a no drip condition the resistance between the second contact of the door and the second electrical conductor is at a relatively high level, further, in a drip condition, the resistance is decreased to a pre set level, and further yet, in a leak condition the second contact of the door comes into reduced electric resistance communication with the first end of the second electrical conductor, thereby decreasing the resistance between them to a minimum resistance value, and second electric resistance detector circuit means connected between the second ends of the first and second electrical conductors for producing an output when there is minimum resistance between the first and second electrical conductors.

10. A fluid drip detector installed in a fluid feeding line for sensing presence of drops and leaks of fluid therefrom comprising;

a hollow housing having a bore for fluid passage therethru;

a first electrical conductor having a first end protruding from the housing into the bore and a second end protruding out of the housing;

an electrically conducting seat disposed in the bore;

a seat electrical conductor having a first end connected to the seat and having a second end protruding outside of the housing;

an electrically conducting moveable door means urged against the seat by urging means, said moveable door means capable of mechanically engaging with and/or disengaging from the seat; the door being responsive to fluid drip at the door means through being responsive to a drip via the hydraulic pressure drop caused by the presence of a drop in the housing, thereby disengaging the seat in a drip condition, and engaging the seat in a no drip condition, such that in a no drip condition the door communicates electrically with the first electrical conductor and engages the seat, creating a minimum electrical resistance between the door and the seat, and in a drip condition, the door being disengaged from the seat with a small separation gap therebetween, thus creating an increase in resistance between the door and the seat, and first electric resistance detector means connected between the second end of the seat electrical conductor and the second end of the first electrical conductor, for producing an output when detecting a change in electrical resistance.

11. A fluid drip detector as in claim 10 further having a second electrical conductor having a first end protruding into the bore at the opposite end from the location of the first electrical conductor in said bore, the second electrical conductor having a second end protruding out of the housing, the second electrical conductor being electrically insulated from the housing, such that in a no drip condition the resistance between the first and second electrical conductors is at a relatively high level, and further, in a drip condition, the moveable door moves axially relative to the second electrical conductor whereby the resistance between the first and second electrical conductors is decreased to a preset level, and further yet, in a leak or flow condition the first electric conductor contacts the second electrical conductor thereby decreasing the resistance between the first and second conductors to a minimum resistance value, and, second electric resistance detector circuit means connected between the second ends of the first and second electrical conductors for producing an output when there is minimum resistance between the first and second electric conductors.

12. A fluid drip detector as in claim 10 wherein the door has a first and a second contacts, the first electrical conductor is in continuous electrical communication with the first door contact, the detector further having, a second electrical conductor having a first end protruding into the bore such that said first end is disposed near to but not contacting the second contact of the door, where said second electrical conductor also has a second end protruding out of the housing, such that in a no drip condition the resistance between said first and second conductors is at a relatively high level, further, in a drip condition, the resistance is decreased to a preset level, and further yet, in a leak condition the door is moved by the fluid such that the second contact of the door contacts the first end of the second electrical conductor, thereby decreasing the resistance between them to a minimum resistance value, and second electric resistance detector circuit means connected between the second ends of the first and second electrical conductors for producing an output when there is minimum resistance between the first and second electric conductors.

13. An electric resistance measuring device to be situated in a fluids handling system for sensing fluid movement in said measuring device, as caused by the presence of any fluid drops or fluid leakage, comprising:

a housing having a bore therethru to permit fluid flow and passage thru the housing, the bore having a seat;

a moveable door means situated in the bore, normally engageable with the seat when there is no fluid flow, but disengageable from the seat in response to any fluid movement;

whereby, fluid movement disengages the door from the seat via the presence of said fluid therebetween, thus changing the electrical resistance measured between the seat and the door, thereby indicating the presence of fluid drops or leaks.

14. A fluid supply system having the fluid drip detector as in claim 10, capable of detecting fluid movement, further comprising:

an adjustable timer means connected to the first electric resistance detector means for allowing the user to select a time period in which a continuous fluid flow or movement from said fluid feeding line passing thru the bore of said housing is possible while the output signal of the resistance detecting means is ignored, and an alarm for signaling the presence of a fluid leak condition, and a fluid supply cut-off means situated in said fluid feeding line, where said cut-off means is electronically controlled by the adjustable timer means, whereby, after said period, if fluid flow or movement is detected by the said electrical resistance detection means, then the output signal of electrical resistance detection means is not ignored and the adjustable timer means actuates the alarm and the fluid supply cut-off means.

15. A fire-suppressant system having a fluid drip detector as in claim 1 mounted in a fluid-pipe having an input end and an output end, said input end connected to a fluid supply line, said fire-suppressant system further comprising a sprinkler-type fire suppressant system in fluid communication with the output of said fluid-pipe; where said sprinkler-type fire suppressant system comprises a sprinkler and an alarm, such that when the sprinkler is spraying fluid, the fluid drip detector detects a fluid output from said system and the alarm indicates the occurence of said fluid output from said system.

16. A fluid drip detector as in claim 1 whereby said moveable door further disengages from the electrical lead in the event of a drip condition, thereby causing said electric resistance detector means to produce a change in electrical output.

* * * * *